United States Patent [19]

van Dijk

[11] Patent Number: 4,794,741
[45] Date of Patent: Jan. 3, 1989

[54] APPARATUS FOR MACHINING TRANSVERSE ELEMENTS OF A METAL DRIVING BELT

[75] Inventor: Johannes A. van Dijk, Eindhoven, Netherlands

[73] Assignee: Van Doorne's Transmissie B.V., Tilburg, Netherlands

[21] Appl. No.: 848,480

[22] Filed: Apr. 7, 1986

[30] Foreign Application Priority Data

Apr. 12, 1985 [NL] Netherlands ............................ 8501087

[51] Int. Cl.⁴ ........................ B24B 19/00; B24C 3/32
[52] U.S. Cl. ........................ 51/419; 51/215 HR; 51/237 T
[58] Field of Search ............ 51/74 R, 76 R, 78, 80 A, 51/87 R, 110, 112, 129, 103 R, 103 WH, 137, 138, 139, 145 R, 145 T, 215 AR, 215 HM, 215 E, 215 M, 417, 418, 419, 426, 237 R, 237 T

[56] References Cited

U.S. PATENT DOCUMENTS

| | | |
|---|---|---|
| Re. 5,228 | 1/1873 | Warth .................... 51/215 HM |
| 1,384,756 | 7/1921 | Hambuechen .................... 51/74 R |
| 1,415,530 | 5/1922 | Davis .................... 51/215 AR |
| 1,779,823 | 10/1930 | Norton .................... 51/215 HM |
| 2,250,500 | 7/1941 | Rosenberger .................... 51/418 |
| 2,791,069 | 5/1957 | Cleiff .................... 51/108 |
| 4,178,725 | 12/1979 | Goloff .................... 51/290 |

FOREIGN PATENT DOCUMENTS 1191250 4/1965 Fed. Rep. of Germany .
1562455 12/1980 United Kingdom .

OTHER PUBLICATIONS

Patents Abstracts of Japan, vol. 8, Nr. 210 (M-328) (1647), 26 Sep. 1984 & JP, A, 5997344 (Toyota) 5 juni 1984 zie het gehele dokument.
Patents Abstracts of Japan, vol. 8, Nr. 201 (M-325) (1638), 14 Sep. 1984 & JP, A, 5988257 (Alps Denki) 22 mei 1984, zie het gehele dokument.

*Primary Examiner*—Robert P. Olszewski
*Attorney, Agent, or Firm*—Cushman, Darby & Cushman

[57] ABSTRACT

A process for machining the transverse elements of a composite driving belt having a substancially trapezoidal cross-section and intended for use on V-shaped pulleys, consisting of an endless carrier in the form of at least one metallic band and a plurality of transverse elements which rest against one another with the parallel parts of their principal faces and which have been mounted slidably on the carrier, by which the side faces (1, 1a) of the elements (1-2a) which will come into contact with the pulleys are roughened.

9 Claims, 1 Drawing Sheet

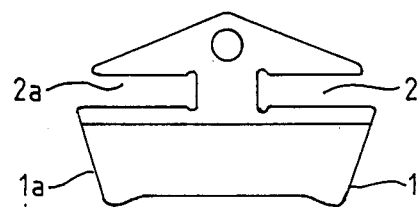
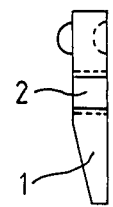
FIG. 1 FIG. 2
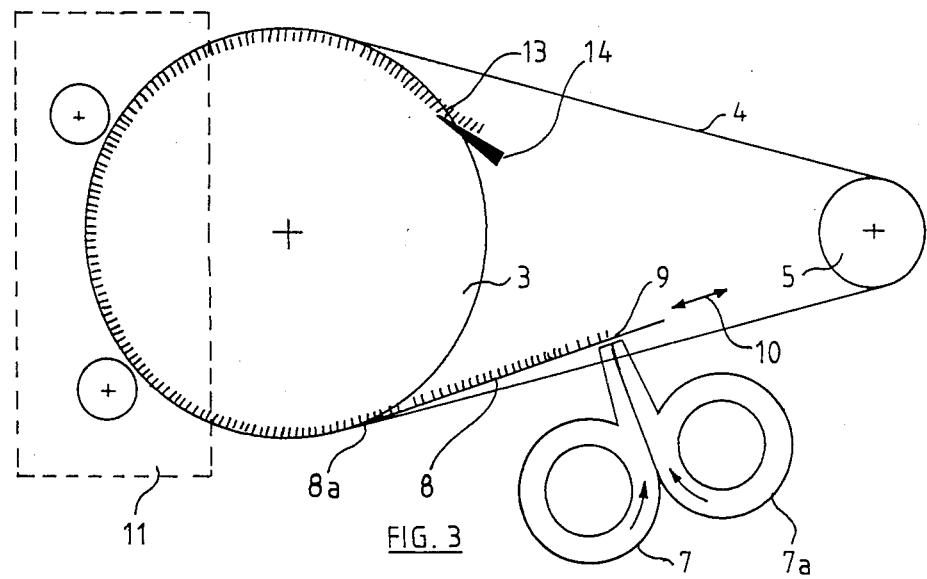
FIG. 3
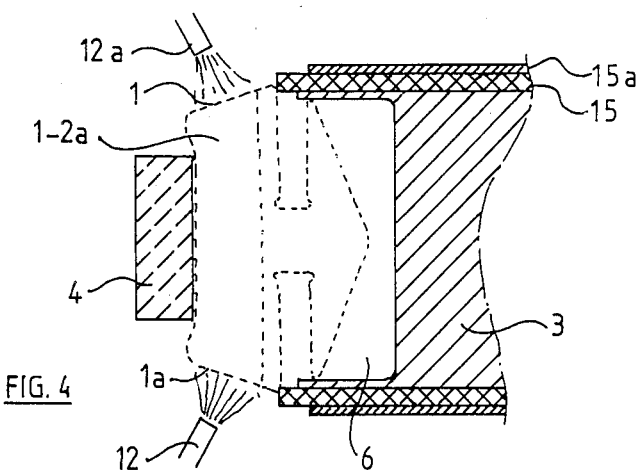
FIG. 4

APPARATUS FOR MACHINING TRANSVERSE ELEMENTS OF A METAL DRIVING BELT

The invention relates to a process for machining the transverse elements of a composite driving belt having a substantially trapezoidal cross-section and intended for use on V-shaped pulleys, consisting of an endless carrier in the form of at least one metallic band and a plurality of transverse elements which rest against one another with the parallel parts of their principal (flat) faces and which have been mounted slidably on the carrier.

The invention also relates to apparatus for conducting the process.

BACKGROUND OF THE INVENTION

A composite driving belt as mentioned above is described in patent specification EP No. 80200035.6. The composite driving belt described therein has transverse elements which have been bevelled radially inwards below the neutral line of the driving belt on at least one of their principal faces in order to permit bending of the driving belt, in such a manner that the transverse elements are in contact with one another on the tilting line where the bevelled zone changes into the parallel part of the principal face, whilst the transverse elements are provided with means of engagement in the form of at least one embossment on a principal (flat) face and a substantially corresponding recess on the other principal face.

For an effective usage of such a metallic belt linking two (adjustable) V-shaped metal pulleys, it is imperative that an oil film is present between the elements of the belt and the walls of the pulleys. This is important for several reasons, such as a controlled coefficient of friction between the elements and the pulleys, an increase in abrasion resistance and hence in useful life, prevention of metal-metal contact and hence of scuffing in case of overloading and the like.

SUMMARY OF THE INVENTION

According to the invention it has been found that, in order to ensure a proper and effective oil film, those side faces of the elements which are to come into contact with the pulleys should be roughened in a specific manner. The oil film's activity is thereby clearly enhanced. This finding is not self-evident; on the contrary, it is generally with polished contact surfaces that oil lubrication has its uses.

Roughening can be done in different manners. The simplest way is to place the elements still to be mounted side by side in a holder such that hardly any space is left between any two elements. Next, the relevant oblique side faces that are to come into contact with the pulleys are machined. This may be done by a mechanical treatment such as grinding or milling, but the simplest procedure is to treat the faces with a blasting medium, for instance by sand-blasting. Obviously, this method is rather labour-intensive and therefore somewhat expensive.

Accordingly, it is an object of the present invention to provide apparatus for conducting the aforesaid machining entirely by mechanical means. The apparatus according to the invention comprises in essence:

(a) a disc whose diameter is large relative to the dimensions of the elements, provided at the circumference with a groove or recess which can also lend support to those parts of the elements which need not be machined;

(b) means for a tangential supply, whereby elements to be treated can be delivered in a predetermined position into the recess or groove of the disc;

(c) a belt which covers elements delivered into and confined within the groove of the disc and retains them radially over part of the circumference of the disc, whilst standing clear of those faces of the elements which have to be machined;

(d) a machining station at some point where the elements are confined under the belt and within the groove of the disc; and (e) means for releasing machined elements, outside the range of the belt, from the groove of the disc and discharging them.

It will be clear that the disc should have a large diameter in relation to the height dimension of the elements in order to attain an extremely narrow slit between individual elements. The ratio of the height of the elements to the radius of the disc must exceed 1:25; specifically, such a disc could have a diameter of, say, 1 meter.

The belt will be an endless one, span a part of the disc and be led back by way of another disc. One of the discs may be provided with means for maintaining the whole in a uniform motion (rotation), but a different mode of drive is also conceivable.

The elements are supplied mechanically in their correct position, for instance with the aid of a vibrating chute. The actual proportioning into the groove of the disc may be effected pulsewise through a feeder chute leading right into the groove of the disc before the elements are embraced by the belt. The pulse mechanism may be a pulsator such as, for instance, the piston of a cylinder mechanism. There is continuous or substantially continuous transport, in which the transverse elements rest against one another and are shielded without any displacement of the means of shielding and/or pick-up relative to the transverse elements.

The pulsewise delivered elements govern the rate of rotation of the disc, so that a close fitting together of the elements is absolutely guaranteed.

The machining of the elements takes place in the way described hereinbefore. The other side faces of the elements which do not necessarily have to be machined are protected by the groove in the disc and by the belt. If the machining comprises grit-blasting, the outer side of the disc is preferably protected with a coating 15, for instance in rubber.

The drawing schematically shows how the elements are confined inside the groove. The mode of fixation can be further improved by a special design of the groove or with ancillary equipment.

BRIEF DESCRIPTION OF THE DRAWINGS

The invention will now be elucidated with reference to a non-limitative example of the relevant apparatus with accompanying drawings, in which FIG. 1 is a front view of a transverse element;

FIG. 2 is a side view of the same element;

FIG. 3 is a diagrammatic top view of the apparatus; and

FIG. 4 is a cross-sectional view through the disc of the apparatus with the blasting means.

DETAILED DESCRIPTION

FIG. 1 presents a front view of an element to be machined. The embodiment may deviate from this example, but essential parts are the faces 1 and 1a forming the oblique sides of the substantially trapezoidal cross-section (front view). The slits 2 and 2a in this example are intended for receiving the endless (metallic) belts or belt packages. It is these sides 1 and 1a which must be roughened in specific manner.

FIG. 3 presents a top view of the apparatus described. Round the disc 3, in this example having a diameter of 1 meter, runs an endless belt 4 which reverses via disc 5. The large disc 3 is provided with a groove 6 into which the transverse elements 1, 1a, 2, 2a can be received in such a fashion that the faces 1 and 1a fall outside the profile of the groove 6. The transverse elements 1-2a are embraced by the belt 4.

Ancillary parts 7, 7a conduct the transverse elements (1-2a) in the proper position to a feed chute 8 which is virtually tangential relative to the disc 3 at a point 9, from where they are pushed in a continuous row into the groove 6 of the disc 3 with the aid of a pulsator 10 represented by an arrow, whereupon they are held tightly by the belt 4. The pulsating delivery may at the same time bring about the rotation of disc 3.

According to FIG. 4, as the elements (1-2a) move along in a continuous line, they pass through a blasting booth 11 in which the faces 1 and 1a are treated with the blasting jets 12 and 12a for a period of time and with an intensity required to impart the necessary roughness.

At a point 13 the elements (1-2a) are lifted from the groove 6 by means of a scraper 14 and discharged.

The drawing represents the principle of the invention schematically. Several embodiments are possible which differ on minor points without affecting the basic principle. Thus, the protective coating 15 may itself be reinforced by a further protective layer 15a.

I claim:

1. Apparatus for roughening the smaller side faces of substantially flat transverse elements of trapezoidal form for a composite driving belt for use with V-shaped pulleys, said apparatus comprising a rotary disc having a diameter which is large relative to the dimensions of the elements to be roughened provided at the circumference with a continuous circumferential groove which is capable of accommodating those parts of the elements which need not be machined and which is also capable of supporting the elements; a substantially tangential supply line for the delivery of elements to be machined in a predetermined position into the groove of the disc, in which supply line the elements are held in contact resting with their flat faces against one another; a belt which covers said elements while in contact with one another delivered into the groove of the disc and radially embraces the contacting elements so confined over part of the circumference of the disc while standing clear of side faces of the elements which have to be machined; a roughening station, including means for roughening said side faces of the elements, wherein the elements are confined under the belt and within the groove of the disc as they pass through the roughening station; and means for releasing roughened elements outside the range of the belt from the groove of the disc and discharging the released elements.

2. Apparatus as in claim 1 wherein the ratio of the height of the transverse elements to the radius of the disc is between 1:25 and 1:150.

3. Apparatus as in claim 1 wherein the belt is endless and is led back by way of another disc.

4. Apparatus as in claim 1 wherein the disc is provided with means for rotating it.

5. Apparatus as in claim 1 wherein the transverse elements after having being delivered in said predetermined position, are introduced through a feed chute by a pulse mechanism so as to arrive in a continuous line in the groove of the disc at a point where they will be embraced by the belt.

6. Apparatus as in claim 2 wherein the roughening means are positioned within the periphery of the disc round which the belt has been looped.

7. Apparatus as in claim 1 wherein the roughening means includes a blasting device.

8. Apparatus as in claim 1 wherein the groove in the disc and the width of the belt are of such a configuration that in essence only said certain faces of the elements are accessible.

9. Apparatus as in claim 8 wherein the circumference of the disc is provided with a protective coat which seals off the elements.

* * * * *